United States Patent [19]

Chakraborty et al.

[11] Patent Number: 4,992,407
[45] Date of Patent: Feb. 12, 1991

[54] CATALYST CONSISTING OF A METAL LAYER SYSTEM FOR THE REMOVAL OF HYDROGEN FROM A GAS MIXTURE

[75] Inventors: Amiya K. Chakraborty, Erftstadt; Edmund Kersting, Overath; Jurgen Rohde, Bergisch-Gladbach; Karl-Heinz Klatt; Helmut Wenzl, both of Julich; Ralf Konrad, Sinn, all of Fed. Rep. of Germany

[73] Assignees: Forschungszentrum Julich GmbH, Julich; Gesellschaft fur Reaktorsicherheit (GRS)mbH, Cologne, both of Fed. Rep. of Germany

[21] Appl. No.: 387,652

[22] Filed: Jul. 31, 1989

[30] Foreign Application Priority Data

Aug. 4, 1988 [DE] Fed. Rep. of Germany ....... 3826503

[51] Int. Cl.$^5$ .................... B01J 21/04; B01J 23/72; B01J 23/89
[52] U.S. Cl. .................... 502/327; 502/326; 502/439; 502/527
[58] Field of Search ................ 502/439, 527, 326, 327

[56] References Cited

U.S. PATENT DOCUMENTS 4,673,663  6/1987  Magnier .................... 502/527 X

FOREIGN PATENT DOCUMENTS 63-162045  7/1988  Japan .................... 502/527

Primary Examiner—W. J. Shine
Attorney, Agent, or Firm—Scully, Scott, Murphy & Presser

[57] ABSTRACT

A catalytically acting system of metal layers for the removal or elimination of hydrogen from a gas mixture, which also contains hydrogen and oxygen. The system of metal layers possesses a surface layer which faces the gas mixture, and which is constituted of a PdNiCu alloy and which acts as a catalyst during the oxidation of the hydrogen. The surface layer is connected with or bonded to a carrier consisting of a heat-conductive material.

12 Claims, 1 Drawing Sheet

CATALYST CONSISTING OF A METAL LAYER SYSTEM FOR THE REMOVAL OF HYDROGEN FROM A GAS MIXTURE

BACKGROUND OF THE INVENTION

The present invention relates to a catalytically acting system of metal layers for the removal or elimination of hydrogen from a gas mixture, which also contains hydrogen and oxygen. The system of metal layers possesses a surface layer which faces the gas mixture, and which is constituted of a PdNiCu alloy and which acts as a catalyst during the oxidation of the hydrogen. The surface layer is deposited with or bonded to a carrier consisting of a heat-conductive material.

DISCUSSION OF THE PRIOR ART

Metal layer systems of this type are contemplated for the prevention of detonations, especially during nuclear reactor accidents, whereby hydrogen is released in the reactor safety containment. It is known to arrange metal layer systems in the reactor installation within containments which are closed during normal operation in such a manner that they are able to open prior to and during the development of an explosive detonating gas mixture and to release the systems of metal layers, whereby these will act as catalysts and reduce the hydrogen constituent present in the explosion-endangered space in the reactor installation through oxidation and the formation of water. Metal layer systems of this type are described in U.S. Pat. No. 4,755,359 and in copending U.S. Ser. No. 225,009; filed July 27, 1988.

It is disadvantageous that the gas atmosphere can evidence gas constituents, especially during reactor accidents, which can reduce the catalytic effect of the PdNiCu surface. Especially iodine vapors or sulfur- or phosphorus-containing constituents, as well as carbon monoxide (CO), lead to the contamination of the catalyst.

SUMMARY OF THE INVENTION

Accordingly, it is an object of the present invention to provide a system of metal layers which catalytically influences the removal of hydrogen, and the catalytic effect of which will not be substantially adversely influenced even in the presence of CO and aggressive gas constituents, such as iodine, sulfur and phosphorus.

The foregoing object is attained, pursuant to the invention, through the intermediary of a catalyst consisting of a metal layer system of the above-mentioned type wherein an intermediate layer selected from the group of materials consisting of vanadium, niobium, titanium and zirconium is applied between the surface layer and the carrier. The catalytically acting PDNiCu surface layer is applied on an intermediate layer of vanadium (V), niobium (Nb), tantalum (Ta), zirconium (Zr) or titanium (Ti). Hydrogen is dissolved in the intermediate layer, so as to penetrate through the PdNiCu surface layer. As a result, the metal lattice or mesh structure widens itself under the formation of the heat of the reaction and dissolution. During this change in the lattice or mesh structure there will be essentially maintained the bonding of the metals on the carrier plate or foil; however, the surface layer consisting of PdNiCu cracks as a result of the extremely widely differing rates of expansion of the individual layers of the metal layer system. This is extremely advantageous in the presence of aggressive media in the gas mixture, inasmuch as this constantly causes fresh unused catalyst surfaces to be exposed which propagate the oxidation of the hydrogen independently of the catalyst which, upon occasion, may have been contaminated through aggressive media.

It is advantageous to employ a carrier or support for the formation of the metal layer system, in which the carrier consists of a material possessing a high degree of thermal conductivity and heat-absorptive capacity, as well as a high coefficient of thermal expansion. Especially adapted for this use are materials such as aluminum or aluminum alloys, copper or copper alloys, and nickel or nickel alloys. Such materials serve not only as heat absorbers or sinks for the receipt of the heat of the dissolution and reaction, especially at the beginning of the catalytic oxidation, but due to their high thermal expansion relative to the thermal expansion of the support metals which are primarily selected as the intermediate layer, also support the desired cracking open of the coating. Preferably, the carrier or support is formed from a material with a thickness of 100 $\mu$m to 10 mm, and preferably 1 mm. By means of such a carrier, the system of metal layers, notwithstanding a considerable development of heat in the intermediate layer, is to be maintained at a lower temperature through heat absorption and dissipation in the carrier, as well as conducting off the heat from the surface of the metal layer system, especially at such a temperature which lies below the ignition temperature of the encountered detonative gas mixture. The metal layer system is also mechanically rigid and will not deform during the reaction of the surface layer and intermediate layer with the hydrogen. With regard to their high extent of thermal expansion, aluminum and aluminum alloys are particularly adapted as carrier or support materials.

The intermediate layer and surface layer are applied as relatively thin films or coatings onto the carrier or substrate. In accordance with a specific feature of the invention, the intermediate layer possesses a thickness of about 1 Angstrom (Å) to 20 micrometers, preferably 2,000 Å, whereas the surface layer is about 1 Å to 20 $\mu$m, preferably 1,000 Å. Such layers allow themselves to be vapor-deposited or sputtered not only onto carrier or substrate foils or sheetings, but also onto meshes or rods which are employed as carriers or supports.

In one embodiment, the carrier comprises a support plate having one side thereof coated with the intermediate layer and the surface layer, and on the opposite side thereof coated only with the surface layer.

Preferably, a carrier plate or substrate possesses an intermediate vanadium layer and a surface layer consisting of PdNiCu on both sides thereof. It is also expedient to apply an intermediate layer to only one side of a substrate which is formed as a carrier foil, and on the other side of the carrier to directly apply the surface layer consisting of PdNiCu. With such a construction it has been ascertained that also differently acting catalyst contaminants are controllable at their concurrent presence in the gas mixture, and form different depositions on both sides of the system of metal layers. The metal layer systems can be employed for the catalytic oxidation of hydrogen in iodine-, sulfur-, phosphorus-, and lead-containing gas mixtures. Even the presence of carbon monoxide in the gas mixture will not inhibit the catalysis.

BRIEF DESCRIPTION OF THE DRAWINGS

The invention and further advantageous features thereof are now elucidated in closer detail hereinbelow on the basis of the exemplary embodiments, in which there are schematically shown in the drawings various cross-sections through metal layer systems; taken in conjunction with the accompanying drawings; in which.

DETAILED DESCRIPTION

Figure 1:
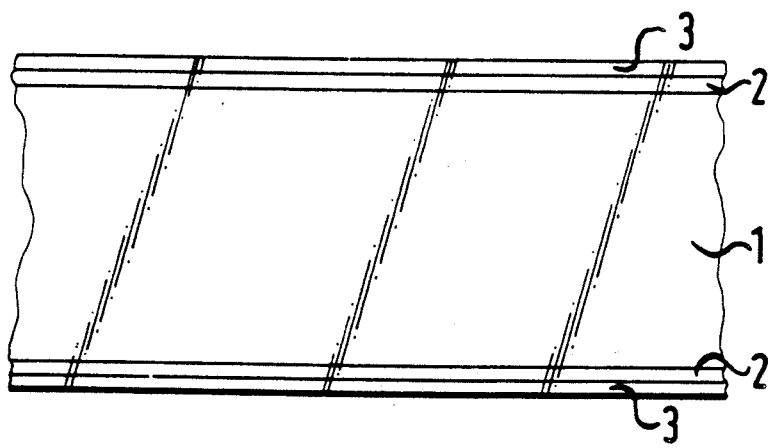
FIG. 1 illustrates a metal layer system which is coated in the same manner on both sides thereof.

In FIG. 1 of the drawing there is illustrated a metal layer system with a substrate of a carrier plate or foil 1, the latter of which is coated on both sides thereof with an intermediate layer 2 and a surface layer 3. The carrier plate 1 is constituted of aluminum, the intermediate layer 2 of vanadium, and the surface layer 3 of PdNiCu. Instead of aluminum there can also be employed other heat-conductive metals with high coefficients of thermal expansion in comparison with the coating materials, especially relative to the intermediate layer, such as Cu or Ni or equivalent alloys. In lieu of vanadium, Nb, Ta, Zr or Ti are also suitable for the intermediate layer. In the illustrated embodiment, the intermediate layer 2 is sputtered onto the carrier plate or foil 1, and the surface layer 3 onto the intermediate layer 2. The carrier plate 1 is surface-roughened for increasing the adhesive strength of the coating prior to the application of the layers (for example, through sand-blasting with follow-up cleaning), whereby the average depth of roughness was greater than the thickness of the subsequent coating. In the exemplary embodiment, the average roughness depth was about 10 μm. During the sputtering or vapor-deposition of the coating, especially at an ion-assisted vapor-deposition, the roughness is then maintained to the greater extent such as to form a highly-effective surface layer.

Figure 2:
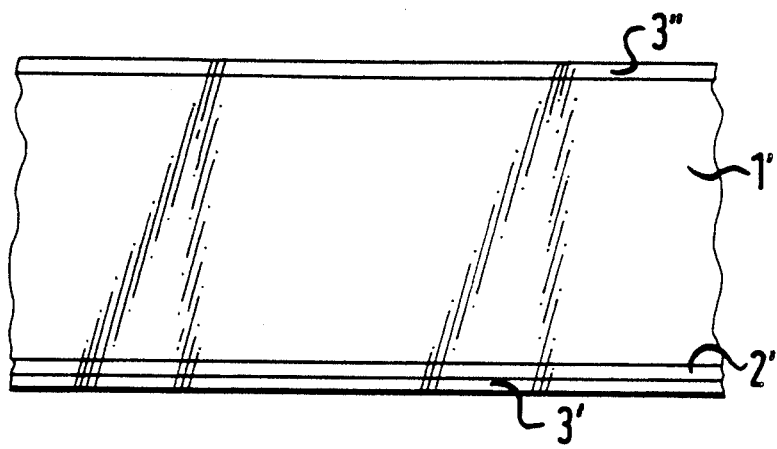
FIG. 2 illustrates a metal layer system with different coatings on opposite sides of the carrier.

In FIG. 2 of the drawings, there is illustrated a metal layer system, whose support or carrier plate or foil 1' is provided with coating on one of the sides thereof, as is shown in FIG. 1; in essence, an intermediate layer 2' consisting of V and a surface layer 3' of PdNiCu, whereas on the other side of which; however, there is only applied a PdNiCu layer as the surface layer 3" without an intermediate or under layer of V. It has shown itself with this construction, when the metal layer system is employed for the removal of hydrogen in iodine-, sulfur- and phosphorus-containing gas mixtures, that the surface layers 3' and 3" evidence different depositions thereon; whereas the surface layer 3' which has been sputtered or vapor-deposited onto an intermediate layer of V, has essentially iodine- and sulfur-containing deposition produced thereon, while the depositions on the surface layer 3' evidence essentially phosphorus.

Figure 3:
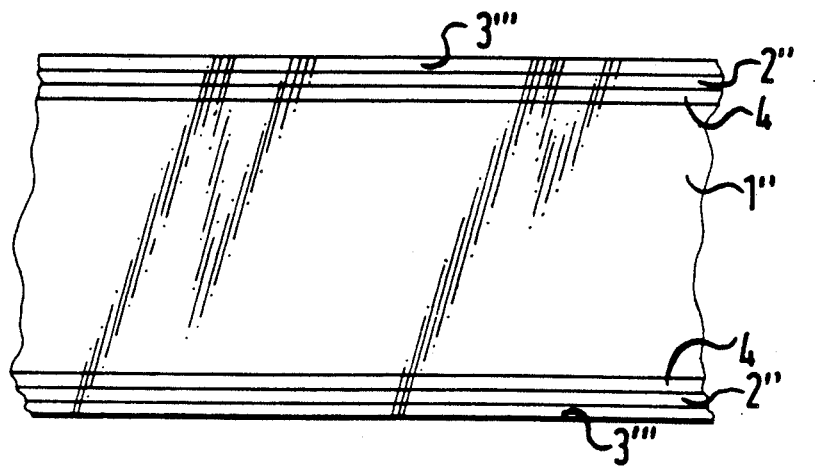
FIG. 3 illustrates a metal layer system with a triple-layered coating of the carrier or substrate.

In FIG. 3 there is represented a metal layer system in which the carrier plate or foil 1" is triply coated. Initially, PdNiCu was applied onto the aluminum support or carrier plate, layer 4, then an intermediate layer 2" of V, and finally the surface layer 3'" of PdNiCu. In the exemplary embodiment pursuant to FIG. 3, all layers have been sputtered onto both sides of the carrier plate or foil. Understandably; however, the coating is also variable; for example, as is illustrated in FIG. 2. The triple-coating can thus be combined with a double layer pursuant to FIG. 1, or also with a single PdNiCu layer as shown in FIG. 2.

In the illustrated exemplary embodiments there are utilized metal layer systems with the following dimensionings:

Carrier plate (Al): 1 mm
Intermediate layer (V): 2,000 to 5,000 Å
Surface layer (PdNiCu): 1,000 Å

The metal layer systems were tested under gas atmospheres which possessed iodine-, sulfur and phosphorus-containing gas constituents or aggressive gases. The gas atmosphere was constituted as follows:

Introduced into a compartment of air under an atmospheric pressure of 1 bar were 10% by volume of hydrogen ($H_2$), about 1% by volume of iodine and sulfur, approximately 0.05% by volume of chlorine and phosphorus, up to 5% by weight of $CS_2(CO)_3$, as well as up to 1% by volume of CO. Due to the catalytic action of the metal layer system, the hydrogen concentration in the above-mentioned, statically-maintained gas mixture of air, hydrogen and aerosols, within a time period of 4 to 6 minutes reduced from 10% by volume to 0.1% by volume. Detonations did not occur.

Comparable results can be achieved with intermediate layers consisting of Nb, Ta, Ti or Zr. The optimum coating or layer thicknesses for the intermediate layers consisted of 10 Å up to 20 μm, preferably 2,000 Å, especially for V. The carrier or support plate or foil for a thickness or the thickness of the rods or mesh wires can be selected to be in the range of between 100 μm up to 1 cm in conformance with the required thermal quality (especially the necessary heat-absorptive capacity) and the stability of the carrier. Optimally manipulatable and effective are the metal layer systems which provide for the utilization of Al carrier or support plates of 1 mm thickness.

As PdNiCu surface layer there has been proven to be successful a PdNiCu alloy, which contains 95% by weight of Pd, 4% by weight of Ni and 1% by weight of Cu. As the lower limit for Pd there is possible 80% by weight of Pd in the PdNiCu alloy, for Ni and Cu there were obtained as maximum limiting values 20% by weight of Ni and 10% by weight of Cu, whereby the metal contents are to be suitably correlated within the above-mentioned bounds. The metal layer systems have also been found useful with lead-containing gas mixtures.

In all instances there could not be observed any or only slight differences during the removal or elimination of the hydrogen through the intermediary of the above-indicated metal layer systems. The limiting values in the layer thicknesses were hereby essentially determined by means of the required adhesive strength, the heat absorption and dissipation in order to prevent any rise in temperature up to the spontaneous ignition of the gas mixture, as well as overall, through the quantity of material necessary for the conversion.

What is claimed is:

1. A catalyst comprising a system of metal layers for the removal of hydrogen from a gas mixture containing hydrogen and oxygen, at least one surface layer of said system facing the gas mixture, said surface layer being constituted of an alloy of PdNiCu; a carrier of a heat-conductive material bonded to the surface layer; and an intermediate layer selected from the group of materials consisting of V, Nb, Ta, Ti, and Zr being arranged intermediate the surface layer and the carrier.

2. A catalyst as claimed in claim 1, wherein said carrier is constituted from a material possessing a high thermal conductivity and heat-absorptive capacity and a high coefficient of thermal expansion.

3. A catalyst as claimed in claim 2, wherein said carrier is selected from the group of materials consisting of aluminum, copper, nickel or alloys of said metals, and has a thickness of between about 100 $\mu$m to 10 mm.

4. A catalyst as claimed in claim 3, wherein said carrier has a thickness of 1 mm.

5. A catalyst as claimed in claim 1, wherein said intermediate layer has a thickness of between about 1 Å to 20 $\mu$m.

6. A catalyst as claimed in claim 5, wherein said intermediate layer has a thickness of 2,000 Å.

7. A catalyst as claimed in claim 1, wherein said surface layer has a thickness of between about 1 Å to 20 $\mu$m.

8. A catalyst as claimed in claim 7, wherein said surface layer has a thickness of 1,000 Å.

9. A catalyst as claimed in claim 1, wherein said carrier comprises support plates having each of the opposite sides thereof coated with an intermediate layer and a surface layer.

10. A catalyst as claimed in claim 1, wherein said carrier comprises a support plate having one side thereof coated with the intermediate layer and the surface layer, and on the opposite side thereof coated with only the surface layer.

11. A catalyst as claimed in claim 1, wherein said intermediate layer is applied onto a carrier plate which is coated with a PdNiCu layer.

12. A catalyst as claimed in claim 1, wherein said carrier has a roughened surface.

* * * * *